United States Patent [19]

Bradfield

[11] Patent Number: 5,195,241
[45] Date of Patent: Mar. 23, 1993

[54] METHOD OF MANUFACTURING A PULLEY WITH INTEGRAL FASTENER AND SPACER

[75] Inventor: Michael D. Bradfield, Anderson, Ind.

[73] Assignee: General Motors Corporation, Detroit, Mich.

[21] Appl. No.: 874,455

[22] Filed: Apr. 27, 1992

Related U.S. Application Data

[62] Division of Ser. No. 802,104, Dec. 4, 1991, Pat. No. 5,163,883.

[51] Int. Cl.$^5$ .............................................. B21K 1/42
[52] U.S. Cl. .......................................... 29/892; 72/356; 72/377; 474/903
[58] Field of Search .................. 29/892, 892.1, 892.11, 29/892.2, 892.3; 72/356, 377; 474/166, 902, 903

[56] References Cited

U.S. PATENT DOCUMENTS

| | | |
|---|---|---|
| 119,504 | 10/1871 | Brooks ........................ 474/160 |
| 826,129 | 7/1906 | Troup . |
| 1,021,764 | 3/1912 | Ditsworth . |
| 1,756,720 | 4/1930 | Andersen et al. ............. 474/181 X |
| 2,119,334 | 5/1938 | Leffler ........................ 474/903 X |
| 2,188,953 | 2/1940 | Mitchell ...................... 74/230.8 |
| 2,489,178 | 11/1949 | Galbreath ..................... 474/181 |
| 2,656,730 | 10/1953 | Mitchell ...................... 474/181 |
| 2,714,820 | 8/1955 | Chamberlain ................. 474/903 X |
| 2,730,906 | 1/1956 | Dickerson .................... 474/199 X |
| 2,925,293 | 2/1960 | Voss et al. ................... 474/903 X |
| 3,080,644 | 3/1963 | Previte et al. ................ 29/159 |
| 3,893,818 | 7/1975 | Mickus ........................ 29/159 |
| 4,254,540 | 3/1981 | Bilak ........................... 72/377 |
| 4,749,375 | 6/1988 | Guevel et al. ................. 474/170 |
| 4,781,661 | 11/1988 | Emmett ........................ 474/190 |
| 4,824,422 | 4/1989 | Jocic ........................... 474/170 |

FOREIGN PATENT DOCUMENTS

| | | | |
|---|---|---|---|
| 2808332 | 9/1979 | Fed. Rep. of Germany ...... | 474/181 |
| 3820932 | 1/1989 | Fed. Rep. of Germany . | |
| 6860 | 2/1971 | Japan ........................... | 72/377 |
| 61-283431 | 12/1986 | Japan . | |
| 63-97324 | 4/1988 | Japan . | |
| 63-137531 | 6/1988 | Japan . | |
| 63-137532 | 6/1988 | Japan . | |
| 63-137533 | 6/1988 | Japan . | |
| 2184 | of 1893 | United Kingdom ............ | 474/903 |
| 301669 | 12/1928 | United Kingdom ............ | 29/892 |

*Primary Examiner*—P. W. Echols
*Attorney, Agent, or Firm*—Creighton R. Meland

[57] ABSTRACT

A one-piece metallic belt driven pulley has a hub, an annular belt engaging wall having an outer belt engaging surface and a radially extending web that connects the hub and belt engaging wall. The hub has an internal bore defined by a tubular inner surface. At least a portion of the tubular inner surface that defines the bore has a plurality of axially spaced threads to form an axially extending threaded portion. In use, the threaded portion of the bore is threaded onto an axially extending thread on an outer surface of the shaft to secure the pulley to the shaft. One end of the hub takes the form of a nut having a hexagonal outer configuration that is adapted to be engaged by a tool for screwing the pulley onto the shaft. The other end of the hub forms an axially extending integral spacer, the end of which is located outwardly of an end surface of the pulley.

2 Claims, 4 Drawing Sheets

METHOD OF MANUFACTURING A PULLEY WITH INTEGRAL FASTENER AND SPACER

This is a division of application Ser. No. 07/802,104 filed on Dec. 4, 1991 now U.S. Pat. No. 5,163,883.

This invention relates to a pulley and more particularly to a pulley that has an integral fastener and an integral spacer and to a method of making such a pulley.

A conventional known method of securing a belt driven pulley to a shaft is to utilize a nut that is threaded onto a threaded portion of the shaft. Such arrangements frequently also utilize a spacer to properly axially position the pulley on the shaft. A pulley arrangement of the general type that has been described for driving the rotor shaft of an alternating current generator is shown in FIG. 5 of the Merrill et al, U.S. Pat. No. 4,604,538. In that patent, spacers are used to space the pulley and external fan from the drive end frame of the generator and a nut is used to secure the fan and pulley to the rotor shaft.

It is an object of this invention to provide a pulley that has an integral spacer and integral fastener so that the need for separate spacers and fastening nuts is eliminated. More specifically, a pulley made in accordance with this invention is a one-piece part that has an outer annular belt engaging portion, that is connected to a hub by a radially extending web. The hub has an axially extending bore that is provided with an internal threaded portion. One end of the hub has an axially extending spacer portion and the other end of the hub has a nut-like outer shape that provides an integral fastener head portion which is hexagonal and which is adapted to be engaged by a tool. In use, the threaded portion of the one-piece pulley is threaded onto a threaded portion of a shaft by engaging the fastener head portion with a tool which rotates the pulley to thread it on the threaded portion of the shaft.

Another object of this invention is to provide a new and improved drive connection between a pulley of the type described and the shaft of a machine which may be the rotor shaft of an alternating current generator.

Another object of this invention is to provide a method of manufacturing a pulley of the type that has been described that includes a plurality of metal forming steps.

IN THE DRAWINGS

Figure 1:
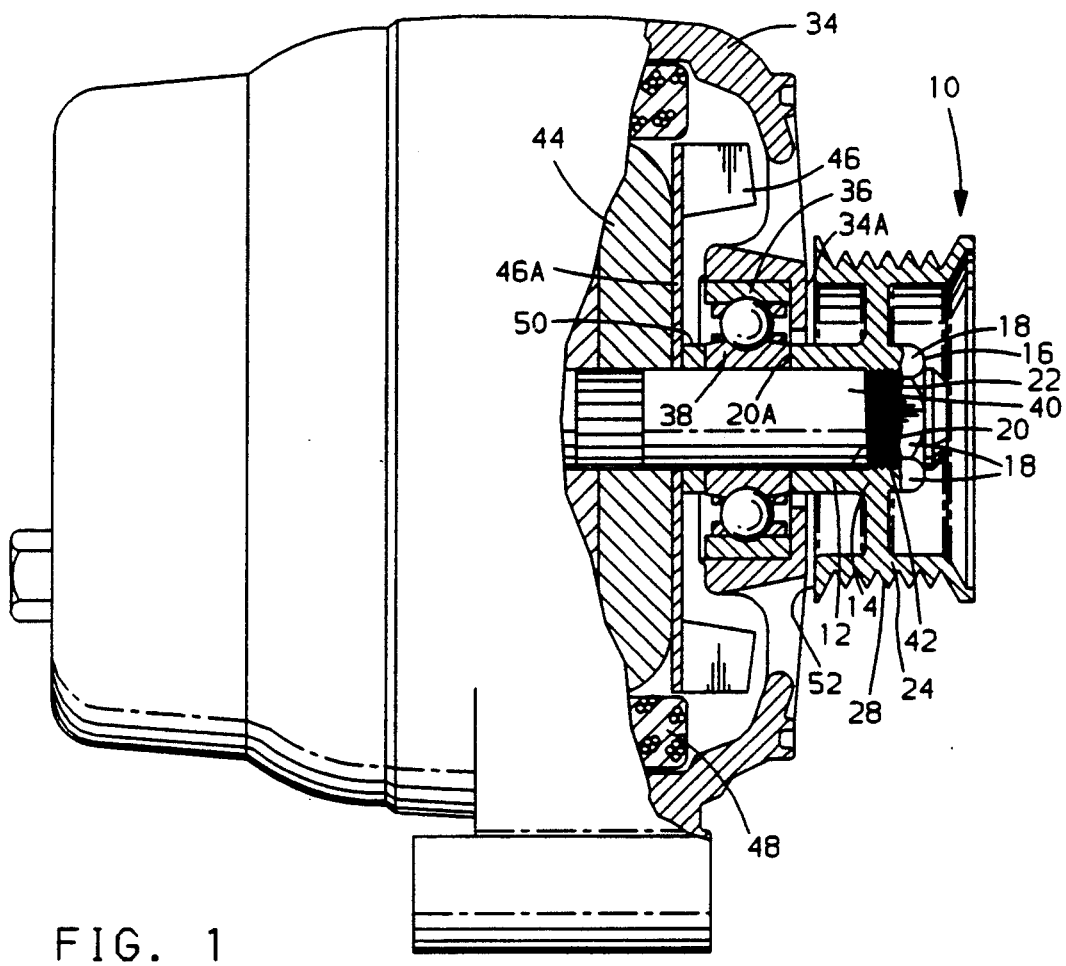
FIG. 1 is a side view with parts broken away of an alternating current generator illustrating a pulley made in accordance with this invention secured to the rotor shaft of the generator.
Figure 2:
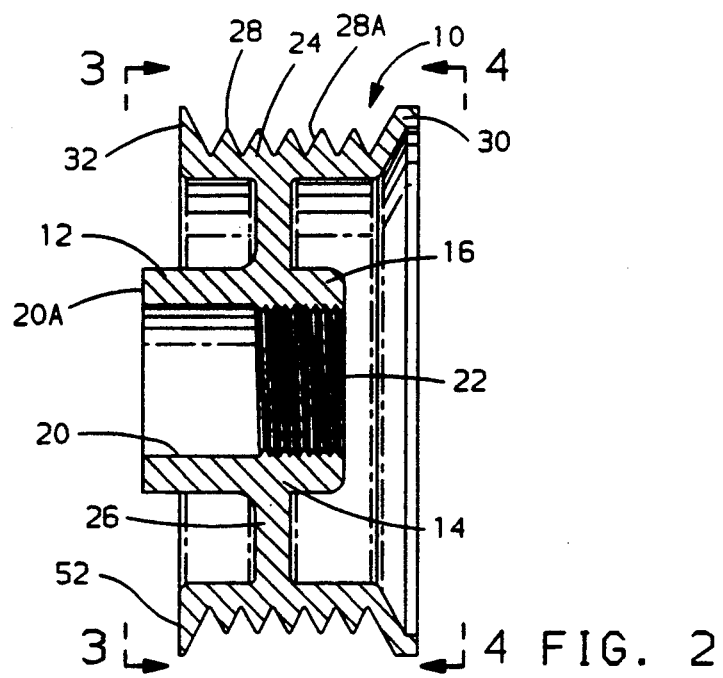
FIG. 2 is a sectional view of a pulley made in accordance with this invention.
Figure 3:
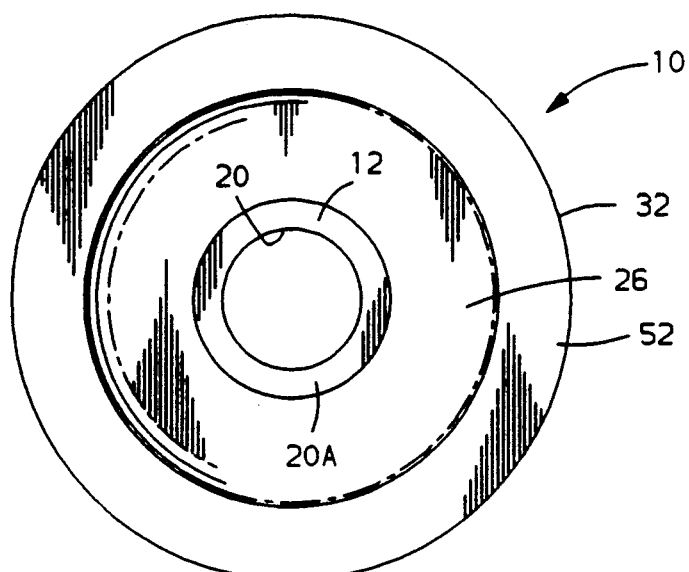
FIG. 3 is an end view of the pulley shown in FIG. 2 looking in the direction of arrows 3—3 shown in FIG. 2.
Figure 4:
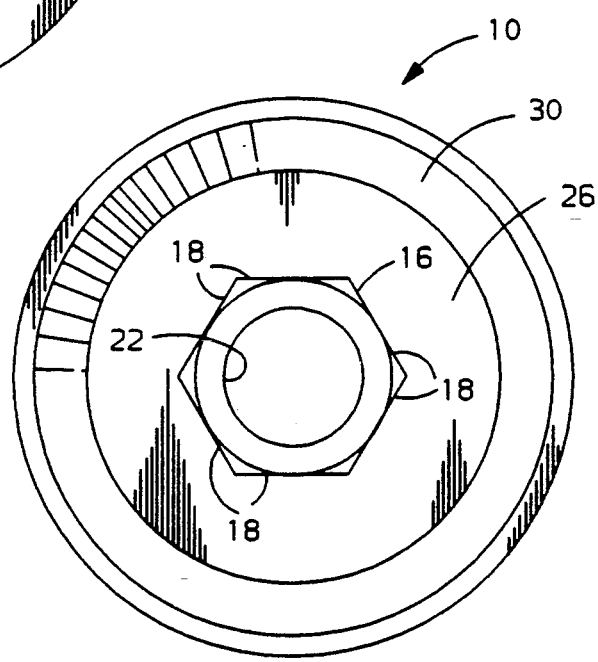
FIG. 4 is an end view of the pulley shown in FIG. 2 looking in the direction of the arrows 4—4 shown in FIG. 2.
Figure 5:
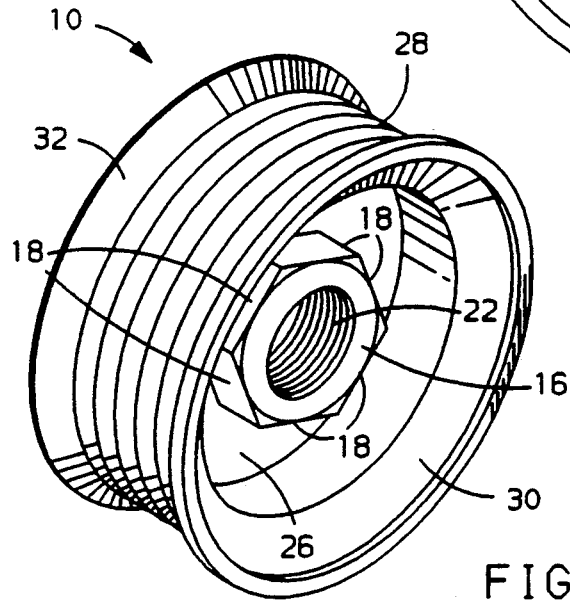
FIG. 5 is a perspective view of a pulley made in accordance with this invention.
Figure 6:
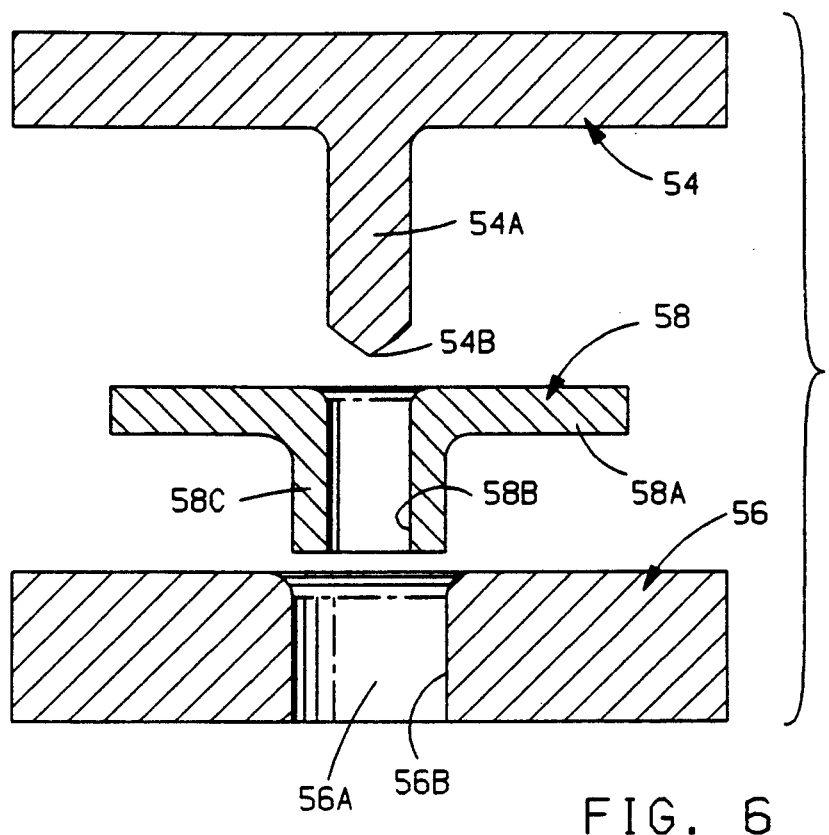
FIGS. 6–10 illustrate metal forming steps that are used in the manufacture of the pulley of this invention.

Referring now to the drawings and more particularly to FIGS. 2–5, the pulley of this invention, which is generally designated as 10, has a hub that is comprised of a spacer portion 12, a center portion 14 and a fastener head or nut portion 16. The pulley is formed of a metallic material such as steel. The outer wall or surface of fastener portion 16 has the shape of a hexagon defined by six flat surfaces 18. In effect, the fastener head portion 16 forms a nut that can be engaged by a tool in a manner to be more fully described hereinafter.

The hub has an internal bore that extends axially entirely through the hub and this bore is defined by a circular internal wall or surface 20 and a circular axially extending internal threaded portion 22 which is comprised of a plurality of threads.

The pulley has a circular outer axially extending wall 24 that is joined to portion 14 of the hub by a radially extending circular web 26. The outer surface of wall 24 has a circular belt engaging surface 28 defined by a plurality of V-shaped grooves one of which is designated as 28A. The pulley further has circular end flange portions 30 and 32.

Referring now to FIG. 1, the pulley of this invention is shown secured to the rotor shaft of a dynamoelectric machine which is an alternating current generator that is of a type that is used to supply electrical loads on a motor vehicle including charging the battery of a motor vehicle. The alternating current generator has a drive end frame 34 that carries a ball bearing having an outer race 36 secured to frame 34 and an inner race 38. The generator has a rotor shaft 40 that has an axially extending threaded portion 42. Rotor shaft 40 carries and is connected to two pole members, one of which is illustrated in FIG. 1 and designated as 44. The pole member 44 carries a fan 46 that has a radially extending portion 46A that engages pole member 44. The portion 46A of fan 46 is welded to pole member 44. The generator has a stator coil winding designated as 48. The slip ring end frame of the generator has another bearing (not illustrated) which rotatably supports the left end of the rotor shaft 40. An annular spacer 50 that surrounds shaft 40 is disposed between portion 46A of fan 46 and the inner race 38 of the ball bearing.

The assembly of the pulley 10 to the rotor shaft 40 of the alternating current generator will now be described. To assemble the pulley 10 to the end of the rotor shaft 40, the internal threaded portion 22 of the pulley is threaded on to the external thread 42 of shaft 40. This threading is accomplished by a tool that has a hexagonal internal wall that engages the hexagonal outer surface of fastener or nut portion 16. The tool is rotated to screw the pulley on to the shaft and to tighten the connection of the pulley 10 to the rotor shaft. As the pulley is rotated to tighten it on shaft 40, the spacer 50 and inner race 38 becomes tightly clamped between fan portion 46A and the end surface 20A of the spacer portion 12 of the pulley. The end surface 20A is axially spaced from an annular end surface 52 of pulley 10 and the amount of the axial space is such that end surface 52 is spaced from an end surface 34A of end frame 34 as shown in FIG. 1. The integral spacer portion 12 of pulley 10 therefore performs the function of spacing the pulley 10 from end frame 34.

The belt engaging surface 28 of the pulley 10 is engaged by a belt which has a surface that is complementary to the V-shaped grooves 28A. This belt is driven by an engine on a motor vehicle.

FIGS. 6–10 illustrate the method of manufacturing the pulley of this invention.

The first step in the method of manufacturing the pulley is to provide a flat circular disk of metallic material such as steel. This disk or slug of material (not illustrated) is then placed between the forming dies 54 and 56 shown in FIG. 6. Forming die 54 has a punch portion 54A that has a conical end 54B. Die 56 has a bore 56A defined by a circular wall 56B. When the dies 54 and 56 are forced toward each other, the punch portion 54A engages the center portion of the metal disk to move the center portion down into bore 56A. At the end of this metal forming step, the flat disk of material has been formed into the shape shown in FIG. 6 where the formed part is designated as 58. Formed part 58 has a circular portion 58A, a bore 58B and an axially extending portion 58C that ultimately becomes pulley spacer portion 12.

Figure 7:
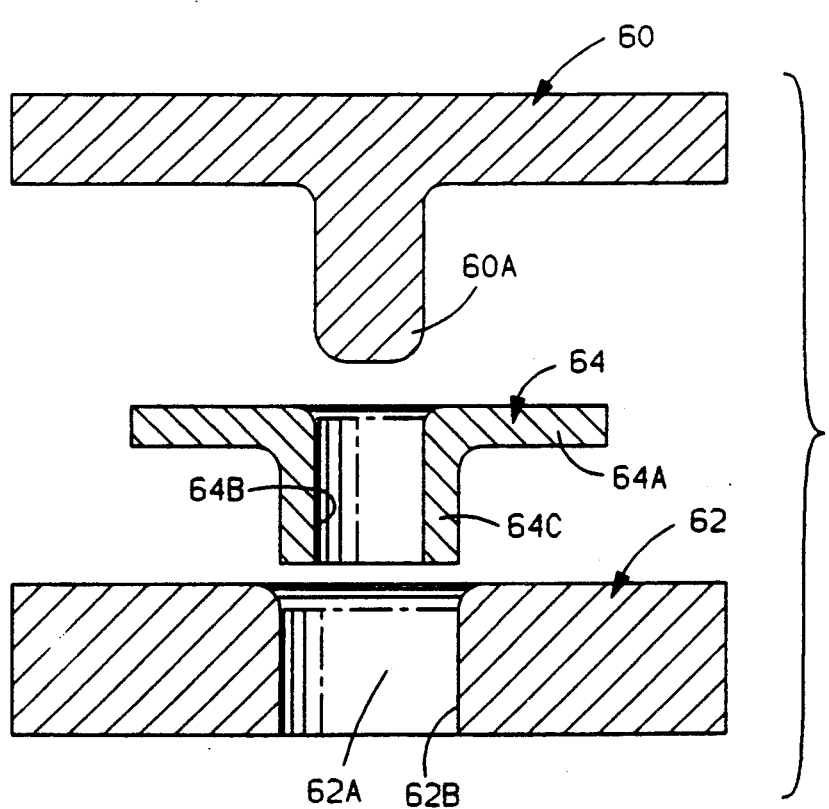

The next step in the method of manufacture of the pulley is to further form the part 58 by means of forming dies 60 and 62 shown in FIG. 7. Forming die 60 has an axially extending portion 60A and forming die 62 has a bore 62A defined by circular wall 62B. In the method step of FIG. 7, portion 58C of part 58 is inserted into the bore 62A of the die 62, shown in FIG. 7 with a lower flat surface of portion 58A engaging an upper flat surface of forming die 62. Die parts 60 and 62 are now brought together causing the part 58 to be formed into the shape of the part 64 shown in FIG. 7. Formed part 64 has a circular portion 64A, a bore 64B and an axially extending portion 64C. By comparing parts 58 and 64, it can be seen that the bore 64B that has been formed has a larger diameter than bore 58B. In this regard, it can be seen that portion 60A of forming die 60 has a larger diameter than portion 54A of forming die 54 and that bore 62A has a larger diameter than bore 56A. Further, the diameter of portion 64A is somewhat smaller than the diameter of portion 58A.

Figure 8:
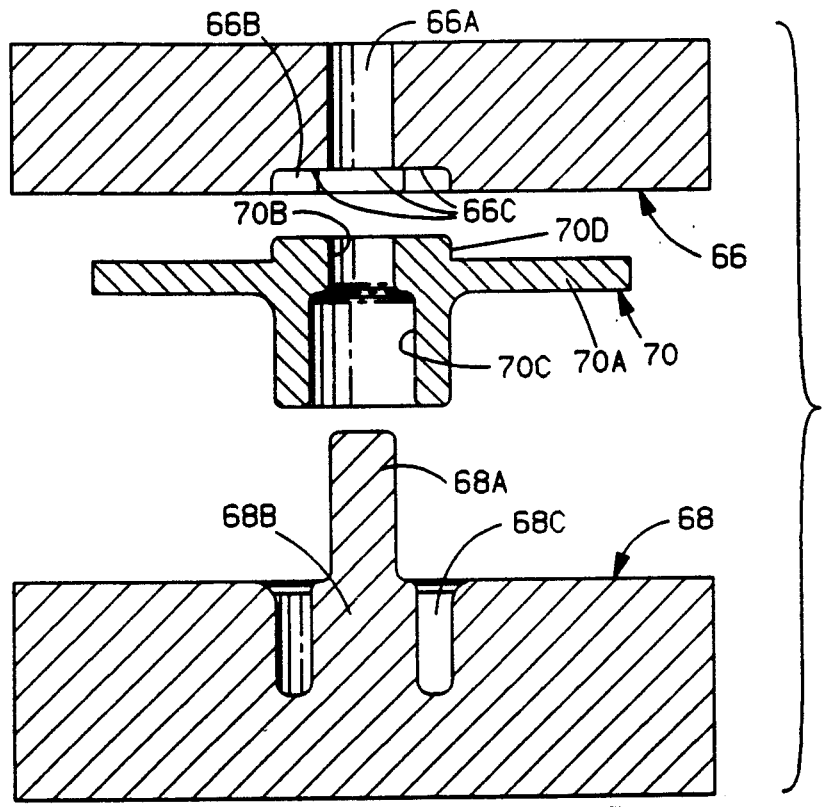

When part 64 has been formed to the shape shown in FIG. 7, it is subjected to the method or process step shown in FIG. 8. FIG. 8 illustrates a metal forming die 66 that has a circular bore 66A and a recess or cavity 66B that has an outer hexagonal wall configuration comprised of six flat surfaces 66C, three of which are shown in FIG. 8.

The forming die apparatus shown in FIG. 8 has another metal forming die 68 that has a circular axially extending portion 68A and a circular portion 68B that has a slightly larger diameter than portion 68A. Forming die 68 also has an annular recess 68C.

In performing the method step (FIG. 8) that utilizes the forming dies 66 and 68, the part 64 shown in FIG. 7 is positioned such that portion 64C is inserted into recess 68C with a lower surface of portion 64A engaging an upper surface of forming die 68. The forming dies 66 and 68 are now forced together with portion 68A moving into bore 66A. When the dies are brought together, the part 64 is formed into a part 70 that has the shape shown in FIG. 8.

Part 70 has a circular portion 70A, bores 70B and 70C, and a hexagonal nut or fastener portion 70D that corresponds to fastener nut portion 16 of pulley 10. Portion 70D is formed by forcing an annular portion of part 64 that is located adjacent and around the upper end of bore 64B into cavity or recess 66B. By comparing portions 64A and 70A, it can be seen that portion 70A of part 70 has been formed to have a larger diameter and a smaller axial length than portion 64A of part 64.

Figure 9:
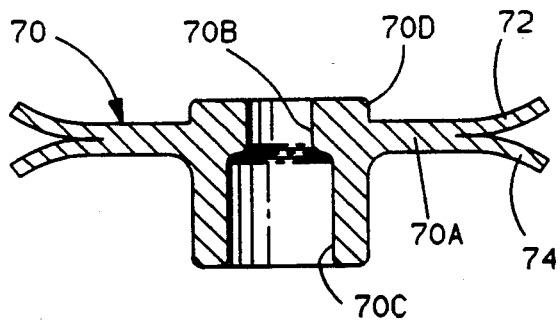

After part 70 has been formed as described, the circumferential outer edge of portion 70A is split into two halves 72 and 74 as shown in FIG. 9 by a splitting tool in a known manner.

Figure 10:
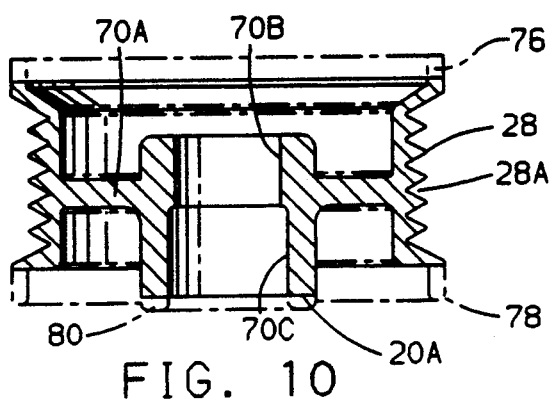

After the split portions 72 and 74 have been formed as shown in FIG. 9, the part as shown in FIG. 9 is subjected to a rolling operation, that is, the split halves 72 and 74 are rolled to form the V-shaped pulley grooves 28A as shown in FIG. 10.

Portions 76 and 78 of the part shown in FIG. 10 are machined off. Further, the part shown in FIG. 10 can be machined off over the annular area designated as 80 to form surface 20A of a finished pulley.

The final step in the method of manufacturing the pulley of this invention is to form threads on the tubular inner surface that defines bore 70B by a suitable thread forming tool.

It is pointed out in connection with FIG. 1 that the pulley 10 drives the rotor shaft 40 through the engaged threads of the pulley and shaft. Thus, torque is transmitted from the pulley to the shaft through the engaged threads of the pulley and shaft. The threads are arranged such that the direction of rotation of pulley 10 that is imparted to pulley 10 by the engine driven belt is such that it tends to screw the pulley onto the shaft or, in other words, in a direction that tends to tighten the threaded connection between the pulley and shaft.

The integral hexagonal nut head 16 has been described as a means that is engaged by a tool to screw the pulley onto the shaft. It will be apparent that the nut 16 also forms a means for unscrewing the pulley from the shaft.

The embodiments of the invention in which an exclusive property or privilege is claimed are defined as follows:

1. A method of manufacturing a pulley that has a hub, a radially extending web, a bore in said hub and a tool engaging head, the steps comprising, providing a flat circular disk of metallic material, die forming a center portion of said disk into a tubular hub that has a bore extending through the hub and through the disk, forcing material of said disk disposed about an end of said bore into a die cavity to form a tool engaging head having a plurality of flat outer surfaces, and then forming threads in the tubular surface defining said bore at least along a portion of the axial length of said bore.

2. The method according to claim 1 where said die cavity has a nut-like configuration.

* * * * *